United States Patent [19]
Lin

[11] Patent Number: 5,913,937
[45] Date of Patent: Jun. 22, 1999

[54] OVERLOAD RELEASE TORSION DAMPING DEVICE FOR A WORM GEAR REDUCER

[76] Inventor: Yu-Hsing Lin, No. 18, Taming St., Lin 14, Tienhsin Li, Fengyuan City, Taichung Hsien, Taiwan

[21] Appl. No.: 08/994,915

[22] Filed: Dec. 19, 1997

[51] Int. Cl.⁶ .................................................. F16H 57/00
[52] U.S. Cl. ............................... 74/411; 74/425; 464/160
[58] Field of Search ............................. 74/411, 425, 427; 464/87, 88, 160

[56] References Cited

U.S. PATENT DOCUMENTS

| | | | |
|---|---|---|---|
| 1,162,034 | 11/1915 | Catucci | 464/160 X |
| 2,317,490 | 4/1943 | Simpson | 74/411 X |
| 2,341,968 | 2/1944 | West | 74/411 X |
| 4,367,660 | 1/1983 | Becker et al. | 74/411 X |
| 4,663,981 | 5/1987 | Louradour et al. | 74/411 X |
| 4,813,303 | 3/1989 | Beezer et al. | 74/425 |
| 5,834,662 | 11/1998 | Stoll et al. | 74/425 |

*Primary Examiner*—Khoi Q. Ta
*Attorney, Agent, or Firm*—Kolisch Hartwell Dickinson McCormack & Heuser

[57] ABSTRACT

A worm gear reducer includes a worm fixedly mounted on a drive shaft rotatably mounted in a housing, a driven shaft rotatably mounted in the housing and including a first end portion formed with an outer thread, a mediate portion with a worm wheel mounted thereon meshing with the worm, and a second end portion. A torsion damping device includes two friction washers each mounted on the driven shaft and each urged on one side of the worm wheel, two abutting rings each securely mounted on the driven shaft and each urged on a corresponding one of the two friction washers, a biasing member mounted on the first end portion of the driven shaft and urged on one of the abutting rings, a sleeve mounted on the first end portion of the driven shaft and urged on the biasing member, and a compression nut engaged on the outer thread of the driven shaft and urged on the sleeve.

6 Claims, 6 Drawing Sheets

OVERLOAD RELEASE TORSION DAMPING DEVICE FOR A WORM GEAR REDUCER

FIELD OF THE INVENTION

The present invention relates to a torsion damping device, and more particularly to torsion damping device for a worm gear reducer.

BACKGROUND OF THE INVENTION

A conventional torsion damping device for a worm gear reducer is shown in FIG. 6, and a complete illustration will follow in the detailed description of the preferred embodiments.

The present invention has arisen to mitigate and/or obviate the disadvantage of the conventional torsion damping device.

SUMMARY OF THE INVENTION

In accordance with one aspect of the present invention, there is provided a torsion damping device in combination with a worm gear reducer which comprises a housing including a first end portion and a second end portion, a drive shaft rotatably mounted in the first end portion of the housing, a worm fixedly mounted on the drive shaft, a driven shaft rotatably mounted in the housing, disposed perpendicularly to the drive shaft and including a first end portion formed with an outer thread, a mediate portion, and a second end portion, and a worm wheel mounted on the mediate portion of the driven shaft, meshing with the worm and including two sides.

The torsion damping device comprises two friction washers each mounted on the driven shaft and each urged on a corresponding one of the two sides of the worm wheel, two abutting rings each securely mounted on the driven shaft and each urged on a corresponding one of the two friction washers, a biasing member mounted on the first end portion of the driven shaft and urged on one of the abutting rings, a sleeve mounted on the first end portion of the driven shaft and including a first end portion urged on the biasing member and a second end portion, and a compression nut threadedly engaged on the outer thread of the driven shaft and urged on the second end portion of the sleeve.

Further features of the present invention will become apparent after a careful reading of the detailed description with appropriate reference to the accompanying drawings.

DETAILED DESCRIPTION OF THE PREFERRED EMBODIMENTS

Figure 6:
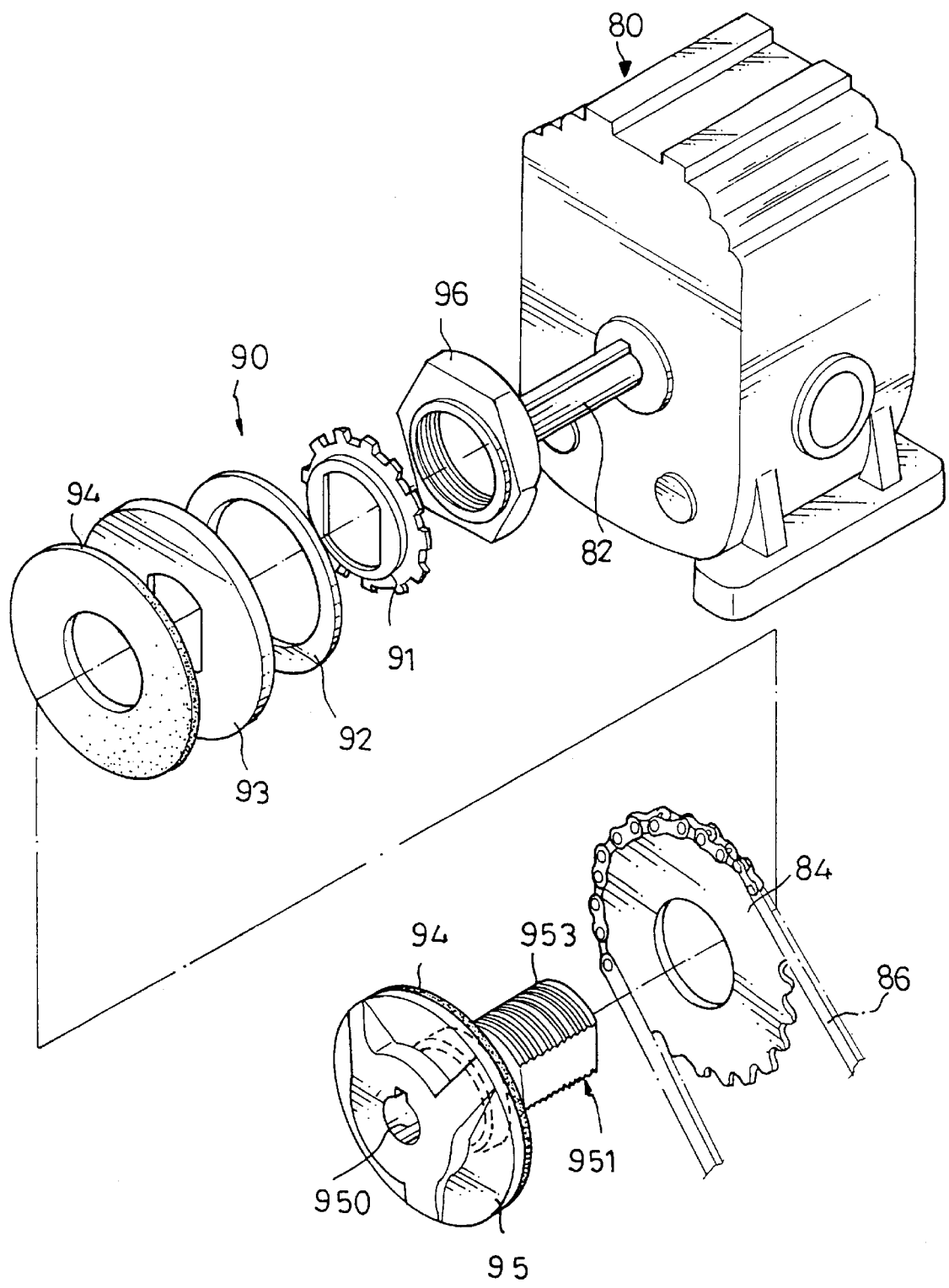
FIG. 6 is an exploded view of a conventional torsion damping device for a worm gear reducer in accordance with the prior art.

For a better understanding of features and benefits of the present invention, reference is now made to FIG. 6, illustrating a conventional torsion damping device 90 for a worm gear reducer 80 in accordance with the prior art.

The torsion damping device 90 comprises an abutting disk 95 fixedly mounted on an output shaft 82 of the worm gear reducer 80 and including a sleeve 951 defining an axial hole 950 for receiving the output shaft 82 and formed with an outer thread 953.

A sprocket 84 is rotatably mounted on the sleeve 91 and meshes with a chain 86 which can be adapted to drive a device such as an electrically controlled scrolling door.

The torsion damping device 90 further comprises two friction washers 94 each urged on a respective side of the sprocket 84, an abutting ring 93 urged on one of the two friction washers 94, a disk spring 92 urged on the abutting ring 93, a washer 91 abutting on the disk spring 92, and a compression nut 96 threadedly engaged on the outer thread 953 of the sleeve 951 and securely urged on the washer 91.

In operation, the abutting disk 95 together with the sleeve 951 can be rotated by the output shaft 82, thereby rotating each of the two friction washers 94 which are urged on the sprocket 84 so as to rotate the sprocket 84 to drive the chain 86.

When the rotation of the chain 86 is stopped suddenly due to the scrolling door failing or due to the scrolling door hitting a foreign object, the sprocket 84 is stopped by the chain 86.

In such a situation, the abutting disk 95 and the abutting ring 93 continue to rotate with the output shaft 82 which is rotated continuously by the worm gear reducer 80, while the sprocket 84 together with each of the two friction washers 94 cannot be rotated with the output shaft 82 due to the chain 86 being stopped, thereby preventing the sprocket 84 being worn out by means of the each of the two friction washers 94.

By such an arrangement, however, the output shaft 82 can be coupled with a sprocket or a gear only, and cannot co-operate with another shaft by means of a shaft coupling, thereby greatly decreasing the versatility of the worm gear reducer 80.

Figure 1:
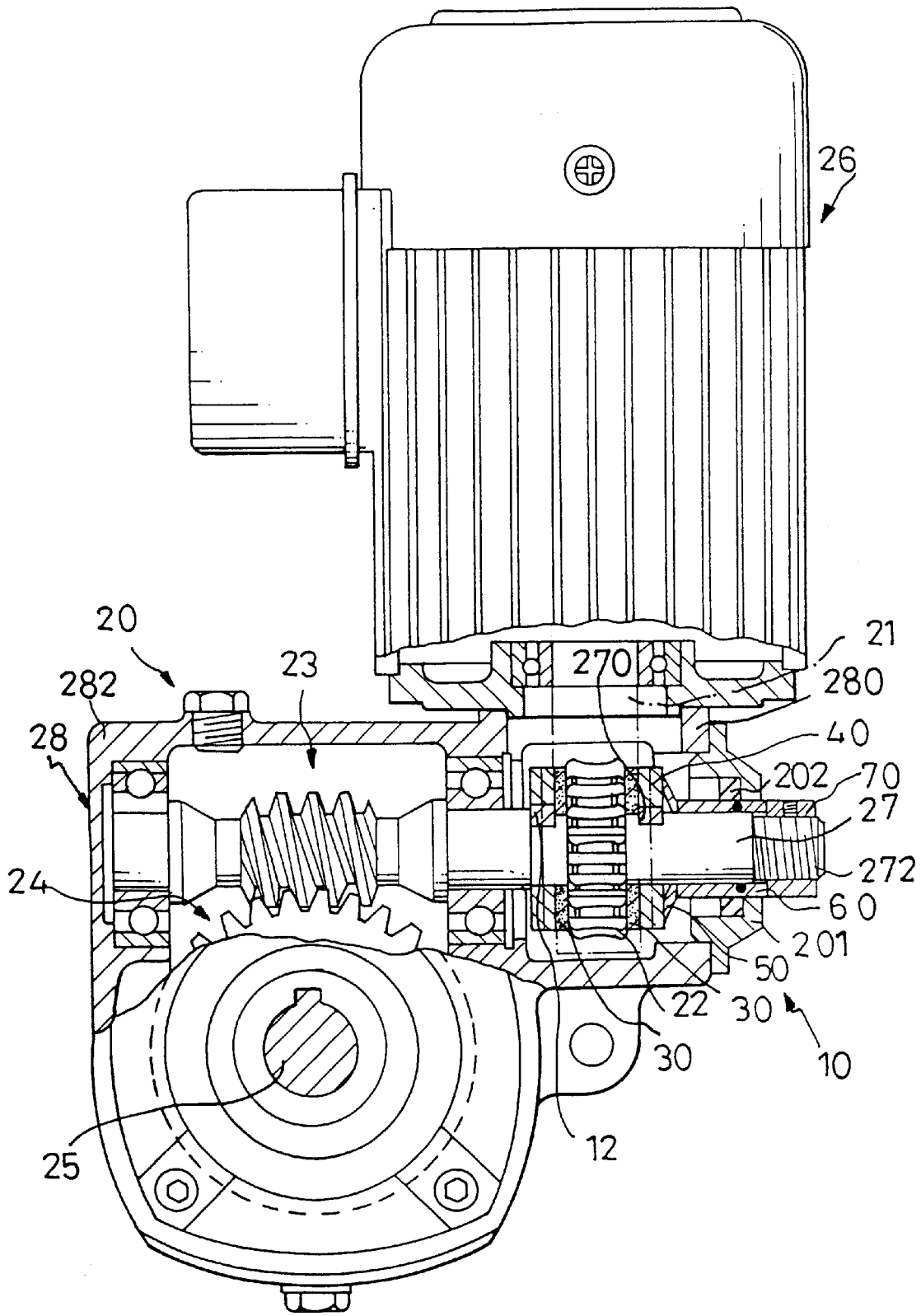
FIG. 1 is front plan partially cross-sectional view of a torsion damping device for a worm gear reducer according to a first embodiment of the present invention.
Figure 2:
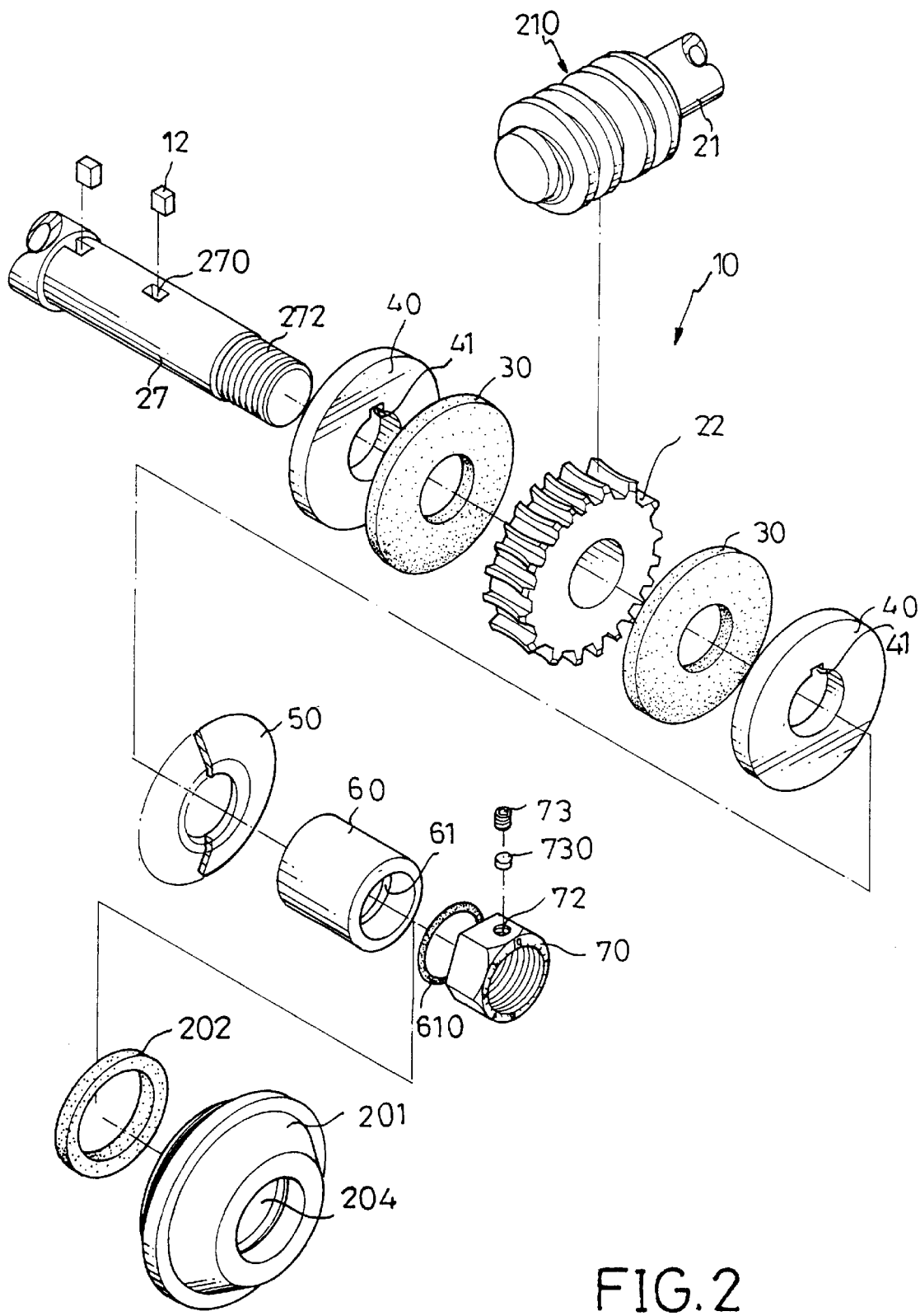
FIG. 2 is an exploded view of the torsion damping device shown in FIG. 1.
Figure 3:
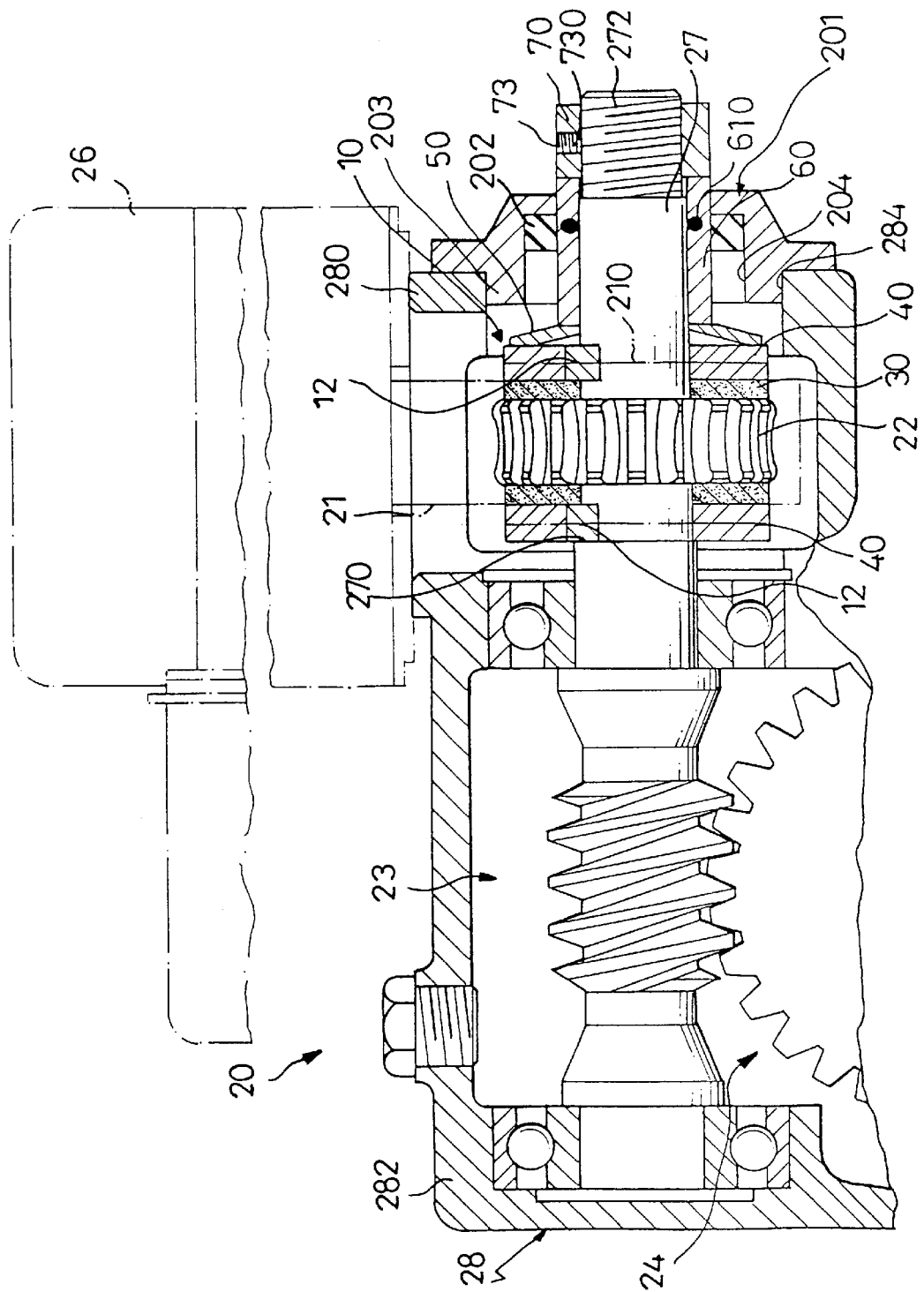
FIG. 3 is a partially cut-away enlarged view of FIG. 1.

Referring to the remaining drawings, and initially to FIGS. 1–3, a torsion damping device 10 in accordance with a first embodiment of the present invention can be provided for a worm gear reducer 20.

The worm gear reducer 20 comprises a housing 28 including a first end portion 280 defining an opening 284 and a second end portion 282. A drive shaft 21 is rotatably mounted through a side wall of the first end portion 280 of the housing 28, and a motor 26 is mounted on the side of the first end portion of the housing 28 for rotating the drive shaft 21. A first worm 210 is fixedly mounted on the drive shaft 21 to rotate therewith.

A driven shaft 27 disposed perpendicularly to the drive shaft 21 is rotatably mounted in the housing 28 and includes a first end portion formed with an outer thread 272 extending outward of the first end portion of the housing 28, a mediate portion, and a second end portion. A first worm wheel 22 meshing with the first worm 210 is mounted on the mediate portion of the driven shaft 27 and includes two sides.

A second worm 23 is fixedly mounted on the second end portion of the driven shaft 27, an output shaft 25 disposed perpendicularly to the driven shaft 27 is rotatably mounted in the housing 28, and a second worm wheel 24 is fixedly mounted on the output shaft 25 and meshes with the second worm 23.

The torsion damping device 10 comprises two friction washers 30 each mounted on the driven shaft 27 and each urged on a corresponding one of the two sides of the worm wheel 22, two abutting rings 40 each securely mounted on the driven shaft 27 and each urged on a corresponding one of the two friction washers 30, a biasing member 50 mounted on the first end portion of the driven shaft 27 and urged on one of the abutting rings 40, a sleeve 60 mounted on the first end portion of the driven shaft 27 and including a first end portion urged on the biasing member 50 and a second end portion, and a compression nut 70 threadedly engaged on the outer thread 272 of the driven shaft 27 and urged on the second end portion of the sleeve 60.

Preferably, the biasing member 50 is a disk spring.

Each of the two abutting rings 40 defines a spline 41 therein, and the driven shaft 27 defines two recesses 270 in the mediate portion thereof each aligning with the spline 41 of a corresponding one of the two abutting rings 40.

Two keys 12 each include a first portion received in a corresponding one of the two recesses 270 and a second portion received in the spline 41 of a corresponding one of the two abutting rings 40 such that each of the abutting rings 40 can be secured on the driven shaft 27.

The compression nut 70 defines a threaded transverse bore 72 through a sidewall thereof. An abutting piece 730 is received in the threaded transverse bore 72 and is urged on the outer thread 272 of the driven shaft 27. A retaining screw 73 extends through the threaded transverse bore 72 and is urged on the abutting piece 730 such that the compression nut 70 can be securely engaged on the outer thread 272 of the driven shaft 27.

The sleeve 60 includes an inner wall defining an annular groove 61 therein for receiving a sealing ring 610 which is tightly urged on the first end portion of the driven shaft 27.

An end cap 201 is mounted on the second end portion of the sleeve 60 and includes a plug 203 fitted in the opening 284 of the first end portion 280 of the housing 28, and a recess 204 is defined in the end cap 201 for receiving a sealing washer 202 which is tightly mounted on the sleeve 60.

In operation, referring now to FIG. 3 with reference to FIGS. 1 and 2, the drive shaft 21 can be rotated by the motor 26 to rotate the first worm 210 which in turn rotates the first worm wheel 22 which in turn rotates each of the two friction washers 30 and each of the two abutting rings 40 synchronously, thereby rotating the driven shaft 27 by means of the two keys.

The second worm 23 can then be rotated by the driven shaft 27 to rotate the second worm wheel 24 which in turn rotates the output shaft 25.

By such an arrangement, an input power supplied by the motor 26 with a high rotational speed and a low torque can be converted into an output power with a low rotational speed and a high torque by means of the first worm 210 cooperating with the first worm wheel 22 and by means of the second worm 23 co-operating with the second worm wheel 24 of the worm gear reducer 10.

The output power with a high torque can then be transmitted to the output shaft 25 which can be adapted to be coupled with a sprocket (not shown) meshing with a chain (not shown) which can be fitted to a device such as an electrically controlled scrolling door (not shown) which requires a high torque for lifting its heavy weight.

When the rotation of the chain is suddenly stopped due to the scrolling door failing or due to the scrolling door hitting a foreign object, the rotation of the output shaft 25 is thus stopped such that the rotation of the driven shaft 27 will be stopped by a meshing engagement between the second worm 23 and the second worm wheel 24, thereby stopping the rotation of each of the two abutting rings 40 by means of the keys 12.

In such a situation, the first worm wheel 22 can still be rotated by the first worm 210 because the motor 26 keeps rotating the drive shaft 21 continuously, thereby exerting a torque on each of the two friction washers 30 overcoming the friction force between each of the two friction washers 30 and the respective abutting ring 40 such that the first worm wheel 22 together with each of the two friction washers 30 can be rotated relative to the driven shaft 27, i.e., the first worm wheel 22 idles on the driven shaft 27.

By such an arrangement, each of the two friction washers 30 of the torsion damping device 10 can be provided to prevent the first worm wheel 22, the first worm 210, and the drive shaft 21 from being worn out.

The torsion damping device 10 is mounted in the housing 28 of the worm gear reducer 20 such that the output shaft 25 not only can be coupled with a sprocket or a gear, but also can co-operate with another shaft by means of a shaft coupling, thereby enhancing the versatility of the worm gear reducer 20.

Figure 4:
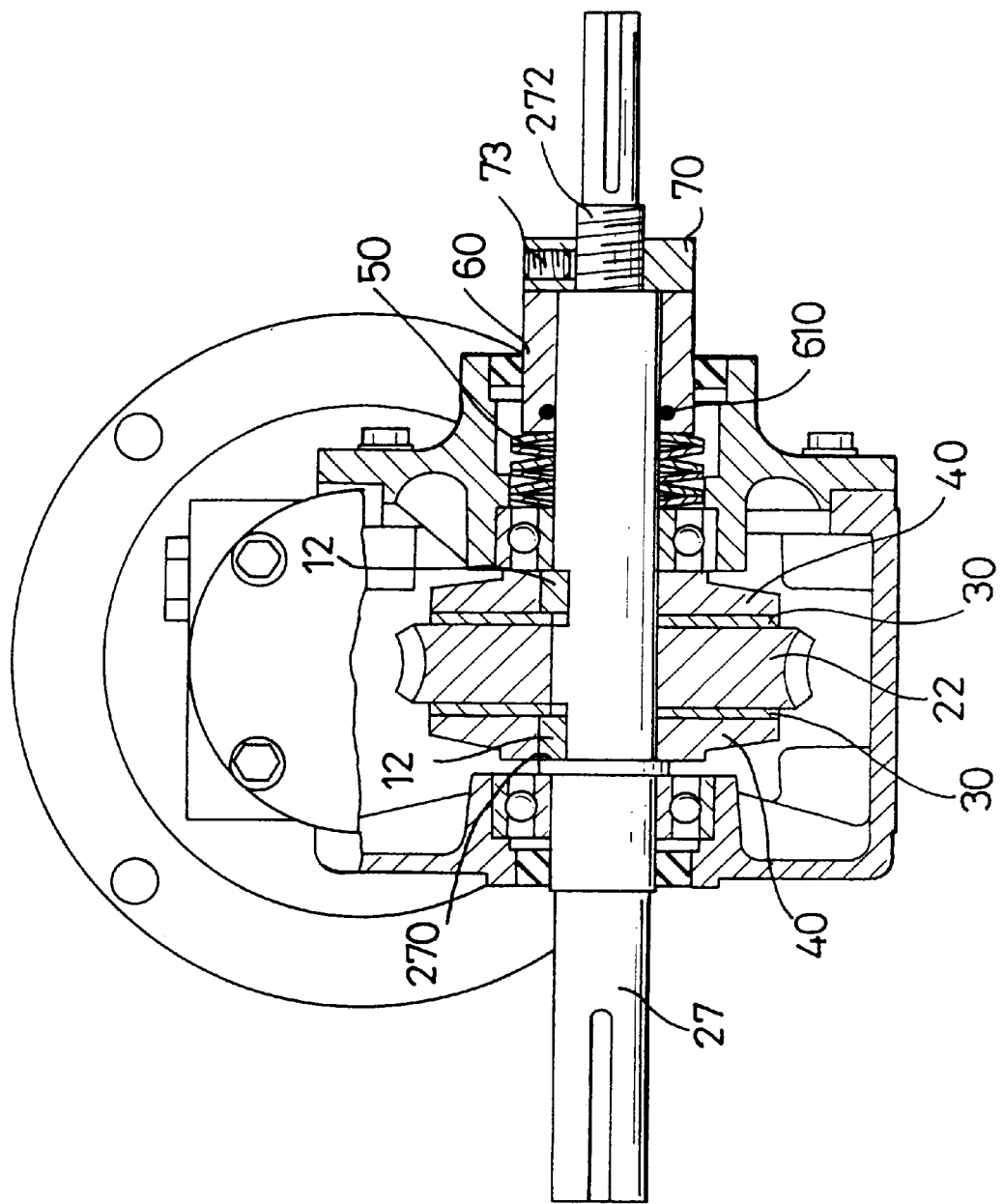
FIG. 4 is front plan partially cross-sectional view of a torsion damping device for a worm gear reducer according to a second embodiment of the present invention.

Referring now to FIG. 4, in accordance with a second embodiment of the present invention, the biasing member 50 includes a plurality of disk springs.

Figure 5:
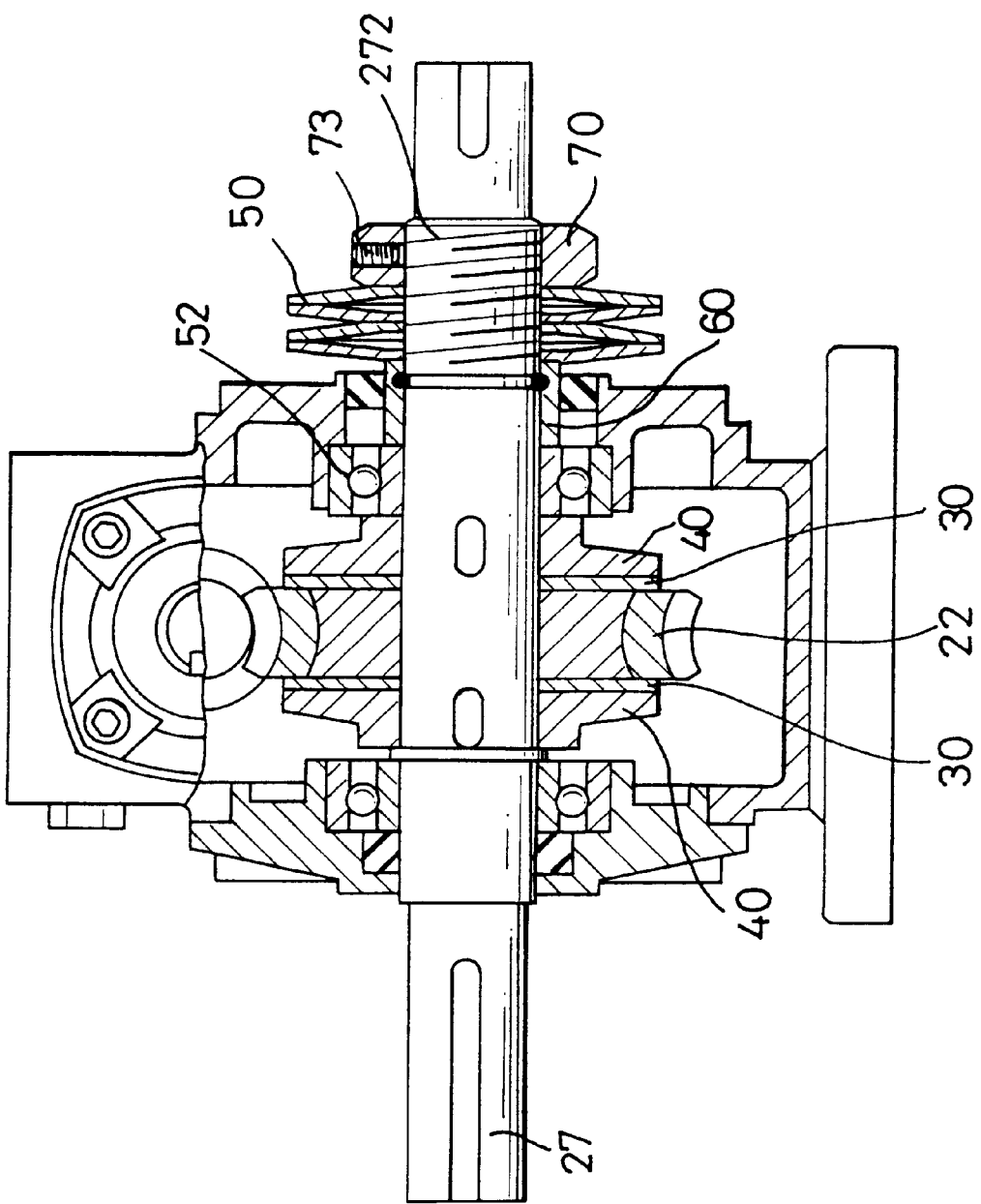
FIG. 5 is front plan partially cross-sectional view of a torsion damping device for a worm gear reducer according to a third embodiment of the present invention.

Referring now to FIG. 5, in accordance with a third embodiment of the present invention, a relative position between the biasing member 50 and the sleeve 60 can be interchanged. In other words, the sleeve 60 is urged on one of the two abutting rings 40 via a ball bearing 52, and the biasing member 50 is urged between the sleeve 60 and the compression nut 70.

It should be clear to those skilled in the art that further embodiments may be made without departing from the scope and spirit of the present invention.

What is claimed is:

1. A torsion damping device in combination with a worm gear reducer (20) comprising a housing (28) including a first end portion (280) and a second end portion (282), a drive shaft (21) rotatably mounted in said first end portion (280) of said housing (28), a worm (210) fixedly mounted on said drive shaft (21), a driven shaft (27) rotatably mounted in said housing (28), disposed perpendicularly to said drive shaft (21) and including a first end portion formed with an outer thread (272), a mediate portion, and a second end portion, and a worm wheel (22) mounted on said mediate portion of said driven shaft (27), meshing with said worm (210) and including two sides, said torsion damping device comprising:

two friction washers (30) each mounted on said driven shaft (27) and each urged on a corresponding one of said two sides of said worm wheel (22);

two abutting rings (40) each securely mounted on said driven shaft (27) and each urged on a corresponding one of said two friction washers (30);

a biasing member (50) mounted on said first end portion of said driven shaft (27) and urged on one of said abutting rings (40);

a sleeve (60) mounted on said first end portion of said driven shaft (27) and including a first end portion urged on said biasing member (50) and a second end portion; and a compression nut (70) threadedly engaged on said outer thread (272) of said driven shaft (27) and urged on said second end portion of said sleeve (60).

2. The torsion damping device in combination with the worm gear reducer in accordance with claim 1, wherein each of said two abutting rings (40) defines a spline (41), said driven shaft (27) defines two recesses (270) in the mediate portion thereof each aligning with said spline (41) of a corresponding one of said two abutting rings (40), and said torsion damping device further comprises two keys (12) each including a first portion received in a corresponding one of said two recesses (270) and a second portion received in said spline (41) of a corresponding one of said two abutting rings (40).

3. The torsion damping device in combination with the worm gear reducer in accordance with claim 1, wherein said compression nut (70) defines a threaded transverse bore (72) through a sidewall thereof, and said torsion damping device further comprises an abutting piece (730) received in said threaded transverse bore (72) and urged on said outer thread (272) of said driven shaft (27), and a retaining screw (73) extending through said threaded transverse bore (72) and urged on said abutting piece (730).

4. The torsion damping device in combination with the worm gear reducer in accordance with claim 1, wherein said sleeve (60) includes an inner wall defining an annular groove (61) therein, and said torsion damping device further comprises sealing ring (610) received in said annular groove (61) and tightly urged on said first end portion of said driven shaft (27).

5. The torsion damping device in combination with the worm gear reducer in accordance with claim 1, wherein said biasing member (50) includes a disk spring.

6. The torsion damping device in combination with the worm gear reducer in accordance with claim 1, wherein said biasing member (50) includes a plurality of disk springs.

* * * * *